M. N. WARD.
Churn.
No. 220,196.    Patented Sept. 30, 1879.
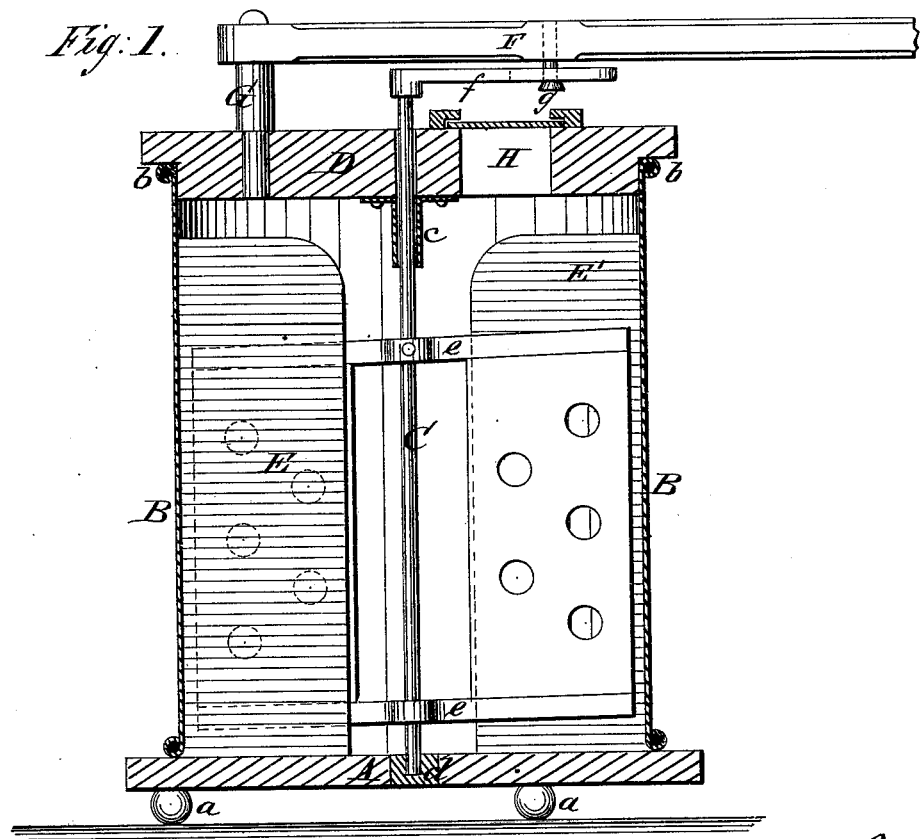
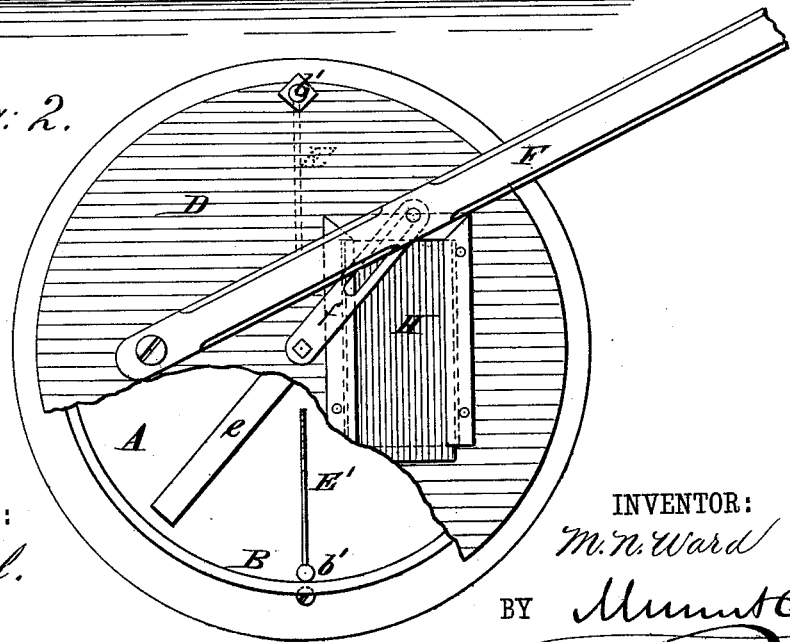
WITNESSES:
A. Schehl.
C. Sedgwick
INVENTOR:
M. N. Ward
BY Munn & Co
ATTORNEYS.

UNITED STATES PATENT OFFICE.

MOSES N. WARD, OF CEDAR RAPIDS, IOWA.

IMPROVEMENT IN CHURNS.

Specification forming part of Letters Patent No. 220,196, dated September 30, 1879; application filed May 28, 1879.

*To all whom it may concern:*

Be it known that I, MOSES N. WARD, of Cedar Rapids, in the county of Linn and State of Iowa, have invented a new and Improved Churn, of which the following is a specification.

The object of this invention is to provide a simple but sufficiently powerful arrangement for operating the dasher of the churn, and to improve the construction and operation thereof in other repects.

The invention consists in a short slotted lever and a long vibratory lever connected by a screw, in combination with a shaft and dasher, as hereinafter described.

In the accompanying drawings, Figure 1 is a vertical section of my improved churn, and Fig. 2 is a plan or top view of the same.

Similar letters of reference indicate corresponding parts.

Referring to the drawings, A is the bottom of the churn, supported by knobs $a$. B is the cylindrical body, and D is the top, provided with a rabbeted edge, $b$, to adapt it to fit into the top of the churn, as seen in Fig. 1.

Screw-studs $b'$, having their heads fixed to the inside of the churn at the top, on opposite sides, project upward and are passed through holes in the top, which is secured by nuts screwed down on it.

E E' are the cream-breakers, placed vertically in the churn, and projecting from the sides toward the center. These reach nearly to the top and are solid, so that the cream cannot pass, except through the space between their outer edges.

The dasher-shaft C is passed down through the center of the top of the churn, and has its lower end pivoted in the metal socket $d$, fixed in the bottom of the churn, while under the cover it passes through a sleeve, $c$, fastened to the under side of the cover by nails passed through its flange.

The dasher is composed of two wings, fastened to the extremities of the arms $e\ e$ at top and bottom, while through the middle of the arms the dasher-shaft is passed, and they are secured to it, so as to hold the wings a short distance above the bottom of the churn. Thus arranged, the wings are on opposite sides of the cream-breakers, and when in operation they vibrate from side to side, but cannot, of course, make a complete revolution.

To the end of the shaft projecting through the top is fixed a short lever, $f$, with a slot extending from its vibrating end. Above this is a long lever, F, fulcrumed in a stud, G, projecting upward from the cover, and connected with lever $f$ by a screw, $g$, passed through the slot in the latter and entered into lever F, whereby, when the longer lever is vibrated, the screw pressing against the sides of the slot vibrates the short lever at the same time, and thus gives motion to the dasher.

The arrangement of the two levers is such that the smaller one, $f$, travels twice as fast as the larger one, thus giving a quick movement to the dasher.

The movement of the dasher throws the cream against the cream-breakers, and from these it recoils against the dashers, thus receiving a double concussion and a most thorough agitation. In addition, the movement makes four separate balls of butter, as the reaction of the cream reverses the balls, so that it rolls them over and gathers the butter as fast as it comes, and when the buttermilk is drawn off it is as thin as water.

The cream-breakers being solid, the particles of butter are not forced through perforations; hence no injury occurs to the grain thereof.

In the cover is an opening, H, covered by a glass slide, through which the interior of the churn can be readily inspected.

The sleeve $c$ prevents the cream from splashing out of the cover around the shaft.

Having thus described my invention, I claim as new and desire to secure by Letters Patent—

The short slotted lever $f$ and long vibratory lever F, fulcrumed in the stud G, and connected with the lever $f$ by screw $g$, passed through the slot, in combination with the shaft C and the dasher, all arranged in connection with the removable cover, substantially as described.

MOSES N. WARD.

Witnesses:
ALEXANDER POFF,
J. S. ANDERSON.